United States Patent
Pank

(10) Patent No.: US 9,957,706 B2
(45) Date of Patent: May 1, 2018

(54) STORMWATER TREATMENT SYSTEM FLOW OPTIMIZATION

(71) Applicant: BAYSAVER TECHNOLOGIES, LLC, Mount Airy, MD (US)

(72) Inventor: Thomas Pank, Walkersville, MD (US)

(73) Assignee: BAYSAVER TECHNOLOGIES, LLC, Mount Airy, MD (US)

( * ) Notice: Subject to any disclaimer, the term of this patent is extended or adjusted under 35 U.S.C. 154(b) by 523 days.

(21) Appl. No.: 14/188,490

(22) Filed: Feb. 24, 2014

(65) Prior Publication Data

US 2015/0240471 A1  Aug. 27, 2015

(51) Int. Cl.
| | |
|---|---|
| *B01D 29/60* | (2006.01) |
| *C02F 1/00* | (2006.01) |
| *E03F 5/14* | (2006.01) |
| *C02F 103/00* | (2006.01) |

(52) U.S. Cl.
CPC ............... *E03F 5/14* (2013.01); *C02F 1/006* (2013.01); *B01D 29/605* (2013.01); *C02F 2103/001* (2013.01); *C02F 2301/043* (2013.01)

(58) Field of Classification Search
CPC .... B01D 29/114; B01D 29/52; B01D 29/605; B01D 29/15; B01D 29/33; C02F 1/006; C02F 9/00; C02F 2301/043; C02F 2103/001; C02F 1/001; E03F 5/14; E03F 5/16
See application file for complete search history.

(56) References Cited

U.S. PATENT DOCUMENTS

| | | | |
|---|---|---|---|
| 2008/0217257 A1* | 9/2008 | Pank .................... | B01D 21/003 210/747.3 |
| 2010/0193418 A1* | 8/2010 | Belasco ................ | B08B 9/0433 210/137 |
| 2012/0080365 A1* | 4/2012 | Mellott .................... | E03F 5/14 210/165 |

* cited by examiner

*Primary Examiner* — Lucas Stelling
(74) *Attorney, Agent, or Firm* — Richard A. Castellano; Dnl Zito Castellano

(57) ABSTRACT

A stormwater runoff treatment system that offers an economical means of achieving highly efficient, effective, and compact means of treating runoff through a unique method of flow restrictions, diversions, elevation differences and strategically located components to achieve a combination of treatment advantages.

8 Claims, 3 Drawing Sheets

PLAN VIEW

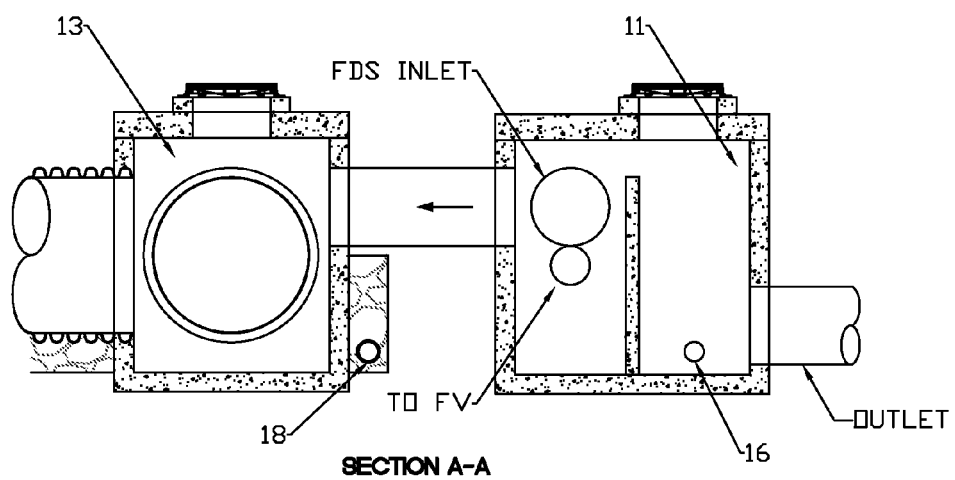
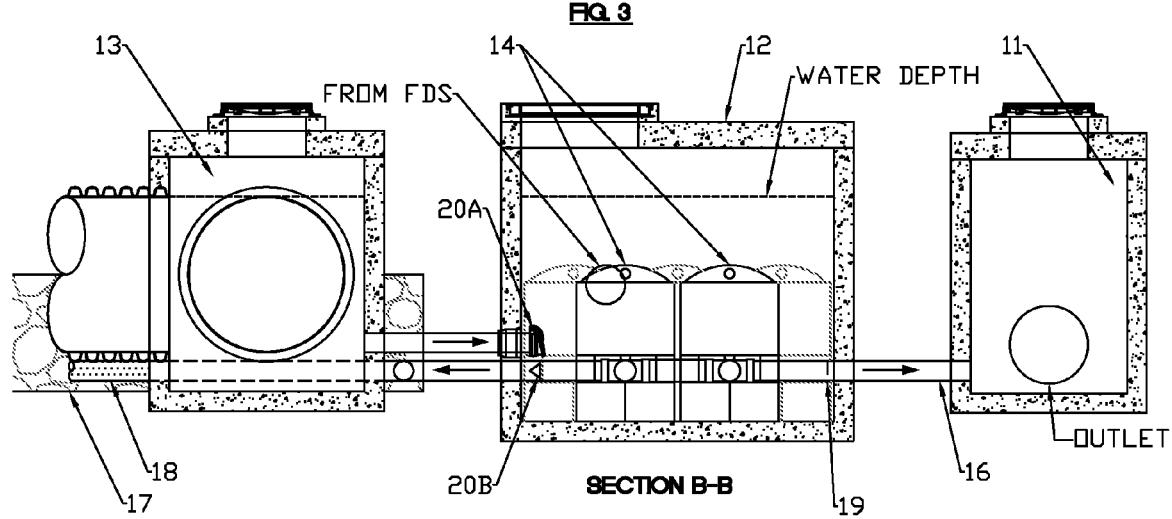

SECTION C-C

STORMWATER TREATMENT SYSTEM FLOW OPTIMIZATION

CROSS-REFERENCE TO RELATED APPLICATIONS

This application claims priority to provisional application 61/769,994 filed on Feb. 27, 2013.

BACKGROUND OF THE INVENTION

Stormwater runoff from impervious surfaces is a serious environmental problem due to the pollutants contained in the water and the additional volume of runoff that is created because the impervious surface no longer allows water to enter the ground. While the field is replete with technologies that clean or filter the water and some that attenuate or slow down the water, there are few that combine all of the above.

The present invention is a unique method of treating and routing stormwater runoff that enables a highly efficient, effective, and compact means of treating the runoff.

Stormwater runoff has a significant variation in intensity: from a light drizzle with virtually no measureable runoff to an extreme intensity localized thunderstorm with flash flooding runoff levels. To remove the level of pollutants required to meet today's regulations, filtration is most often required.

With a filter having a limited flow rate, it takes a substantial filtration area to treat peak flows. The filtration area can be reduced by storing the water prior to filtration and filtering it over time. For example, storage and filtering over a 24 hour period. This storage and delayed release reduces the impacts of peak intensity storms and at the same time reduces the risk of downstream flooding In addition, with the focus on reduction of runoff through ground water replenishment or infiltration, water can be recharged through placing it in a stone pit or equivalent to allow it to percolate into the ground. However this also takes time. A very important element to the longevity of the recharge is that only clean water is recharged because the pollutants will quickly occlude the surface soils in the recharge area and diminish its effectiveness.

SUMMARY OF THE INVENTION

The current invention offers an economical means of achieving all of the above through a unique method of flow restrictions, diversions, elevation differences and strategically located components to achieve a combination of treatment advantages.

The stormwater treatment system performs as follows: Water enters the Flow Diversion (FD); initial flows are diverted to the Filtration Chamber/Filter Vault (FV). When the Filter Vault is full, the water level increases in height and enters the Extended Detention System (EDS). When the EDS is full, the water level increases to a higher elevation where it flows into a bypass outfall.

BRIEF DESCRIPTION OF THE DRAWINGS

FIG. 2 is a side cross sectional view along line A-A of the treatment system of FIG. 1.

FIG. 3 is a side cross sectional view along line B-B of the treatment system of FIG. 1.

DETAILED DESCRIPTION

Figure 1:
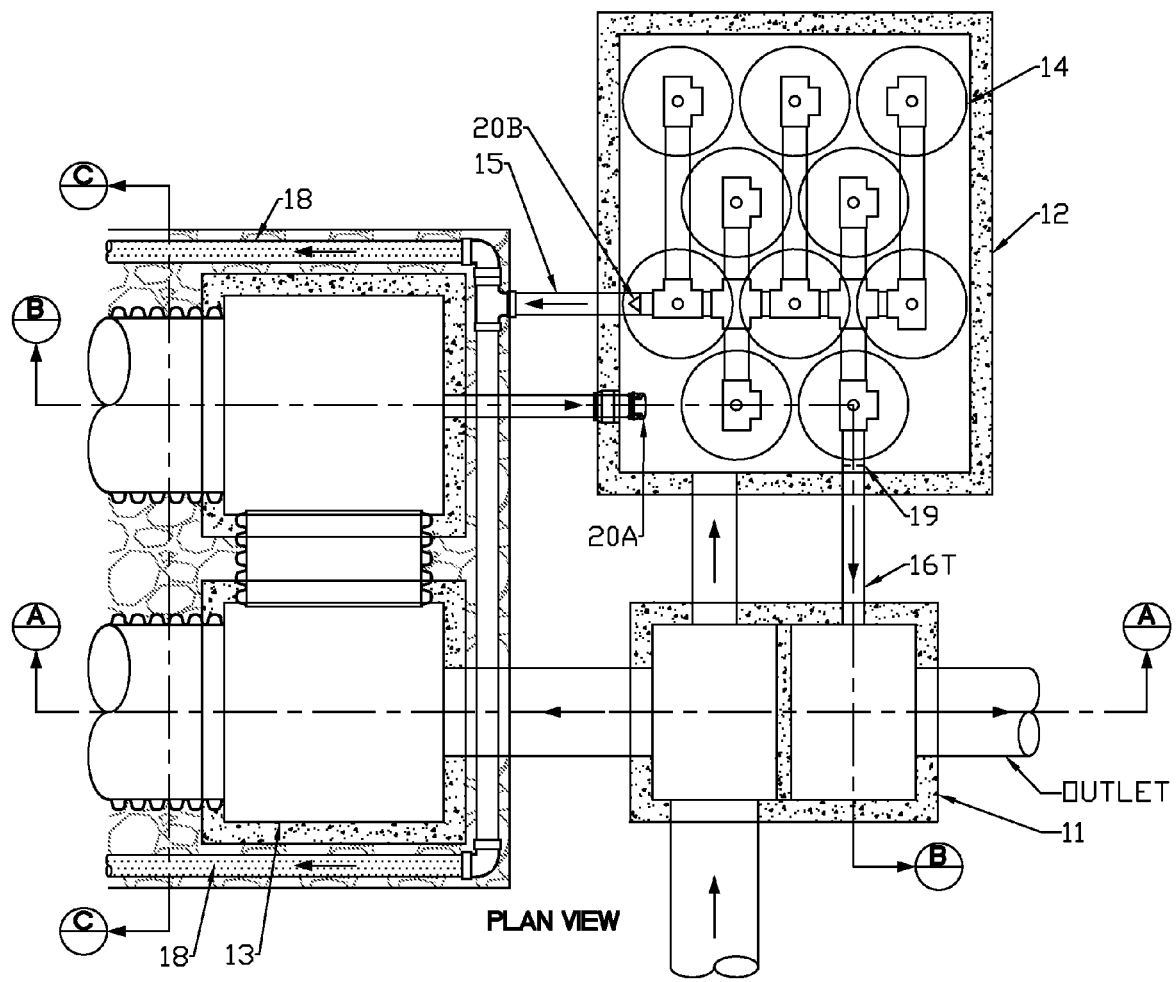
FIG. 1 is a top view of the treatment system as described herein.

As shown in FIG. 1, the stormwater treatment system 10 performs as follows: Water enters Flow Diversion Structure (FDS) 11; initial flows are diverted to the Filter Vault (FV) 12. When the Filter Vault 12 is full, water increases in height and enters the Extended Detention System (EDS) 13. When the Extended Detention System is full, the water level increases in height and is then diverted to a bypass outfall.

As water enters the Filter Vault 12 it passes through the filtration device(s) 14 where the filter effluent can pass through have two outflow locations; a high flow 15 and low/restricted flow outflow 16. The high flow outlet 15 is connected to an underdrain system 17 of the EDS 13 which has perforated pipe 18 or other open chambered collection system and a gravel or sand bottom. This becomes the recharge or infiltration location for the water to enter the ground. This is ideally located in an area where water will most likely percolate into the soils.

The low flow outflow 16 has a flow restriction 19 in it which is sized to release the entire system capacity over a predetermined maximum period of time, for example 24 hours. The filter is able to flow because of head differential, so with the top of the storage in the infiltration stone at or below the maximum height of water in the filter vault the entire infiltration will be filled up with preferential flow as it is unrestricted. During this time a limited amount of water will be released through the flow restriction 19. Optionally, there is a check valve 20$b$ preventing the water from flowing back into the Filter Vault 12 and out the flow restriction. In some situations the check valve will not be necessary or desirable as the check valve will maximize the amount of water that infiltrates by preventing it from flowing back through the orifice.

The connection between the Filter Vault 12 and the EDS 13 has a check valve 20$b$ in it to prevent water that has entered the infiltration stone from flowing back out the orifice. As the water is filtered over time in the Filter Vault 12, and the water level lowers, flap valve 20$a$ will only open as the water level in the Filter Vault 12 becomes lower than the EDS 13, at which time the water will flow into the Filter Vault 12 and be filtered.

FIG. 2 shows a side cross sectional view along line A-A of the treatment system. On the right side of this figure, the Flow Diversion Structure 11 is shown. On the left side of this figure, the Extended Detention System 13 is shown. As shown, water enters the system through the FDS inlet, and initial flows are diverted to the FV.

FIG. 3 shows a side cross sectional view along line B-B of the treatment system. As shown here, the line B-B makes a right angle turn to accommodate the schematic shown. However, it is understood that alternative embodiments and configurations may also be used advantageously with this invention.

Figure 4:
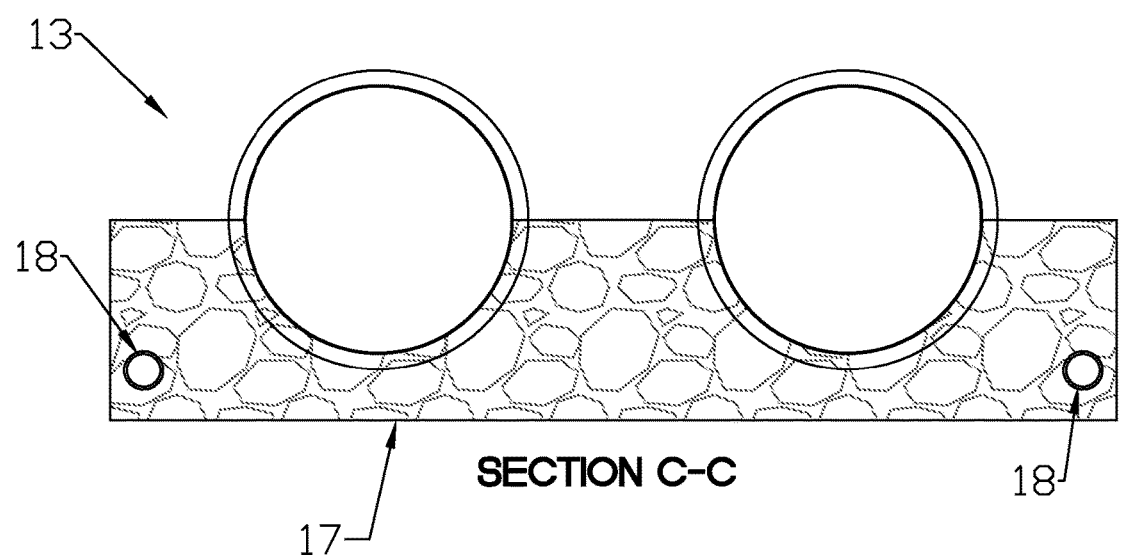
FIG. 4 is a side cross-sectional view along line C-C of the treatment system of FIG. 1.

FIG. 4 shows a side cross sectional view along line C-C of the treatment system. A preferred embodiment of the underdrain system described herein is shown here. Persons with knowledge in the area of the invention would understand that other underdrain systems are also adaptable for use in this invention.

By controlling the flow of stormwater runoff as shown and described—through the use of a series of check valves, orifices, and strategically located components—all water that is not bypassed is either filtered and recharged, or attenuated, filtered, and released.

This configuration provides several substantial advantages over the prior art. For example, less storage is required, more volumes are filtered, more volumes are recharged, and the recharge occurs over a greater surface area. Furthermore, by incorporating the recharge under and/or around the EDS, the system is more economical to construct.

I claim:

1. A system useful for treating stormwater, comprising:
   a flow diversion structure comprising an inlet and forming a first enclosure configured to contain diverted water received through the inlet;
   a filter vault forming a second enclosure communicating with the first enclosure of the flow diversion structure, the flow diversion structure configured to divert the water received by the flow diversion structure to the filter vault through the inlet, the filter vault comprising a filtration device comprising at least one filter configured to filter the water received from the flow diversion structure to produce filter effluent; and the filter vault forming a high flow outflow; and a low flow outflow, the filter vault configured to divert the water through the high flow outflow when the filter vault contains a predetermined amount of the water, and to divert effluent through the low flow outflow at a controlled rate for causing sufficient filtration by the filtration device of the water received by the flow diversion structure through the inlet;
   an extended detention system connected to the high flow outflow, the extended detention system forming a third enclosure and configured to receive the diverted water from the filter vault through the high flow outflow when the filter vault contains the predetermined amount of the water, and
   the filter vault further comprising a check valve configured to prevent back flow of water from the extended detention system to the filter vault through the high flow outflow.

2. The system of claim 1, the low flow outflow further comprising a flow restriction orifice defined by the low flow outflow for controlling a rate of effluent flowing through the low flow outflow.

3. The system of claim 1, the water passing through the high flow outflow when the water diverted into the filter vault reaches a predetermined amount.

4. The system of claim 1, the high flow outlet of the filter vault further comprising said check valve further configured to prevent backflow when the amount of the water the filter vault is below an amount of the water in the extended detention system.

5. The system of claim 1, the low flow outflow further comprising a flow restriction configured to release the entire system capacity over a predetermined maximum period of time.

6. The system of claim 1, wherein a top of the extended detention system is disposed above a bottom of the filter vault.

7. A method for treating stormwater using a system comprising a flow diversion structure comprising a first enclosure configured to contain diverted water, a filter vault comprising a second enclosure connected to the flow diversion structure, the flow diversion structure configured to divert the water to the filter vault, the filter vault comprising a filtration device comprising at least one filter configured to filter the water to produce filter effluent; a high flow outflow; and a low flow outflow, the filter vault configured to divert the water through the high flow outflow when the filter vault contains a predetermined amount of the water, and to divert effluent through the low flow outflow at a controlled rate for causing sufficient filtration of water in the filtration device; an extended detention system comprising a third enclosure connected to the high flow outflow and configured to receive the diverted water from the filter vault through the high flow outflow, and the filter vault further comprising a check valve, the method comprising:
   diverting the stormwater to force an amount of water passing through an inlet of the flow diversion structure to flow into the filter vault;
   filtering the water in the filtration device of the filter vault;
   releasing the effluent from the filter vault through the low flow outflow;
   filling the filter vault with a predetermined amount of the water, and then forcing the water through the high flow outflow to an extended detention system, and
   using said check valve to prevent back flow of water through the high flow outflow from the extended detention system to the filter vault.

8. The method of claim 7, the releasing the effluent at a controlled rate comprising passing the effluent through a restriction orifice defined by the low flow outflow.

* * * * *